(12) United States Patent
Sensyu

(10) Patent No.: US 7,849,378 B2
(45) Date of Patent: *Dec. 7, 2010

(54) OPTICAL DISC, METHOD OF WRITE TO SAME AND METHOD OF READ FROM SAME

(75) Inventor: Susumu Sensyu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1679 days.

This patent is subject to a terminal disclaimer.

(21) Appl. No.: 10/943,864

(22) Filed: Sep. 20, 2004

(65) Prior Publication Data
US 2005/0105439 A1    May 19, 2005

Related U.S. Application Data

(62) Division of application No. 09/353,998, filed on Jul. 15, 1999, now Pat. No. 7,039,913.

(30) Foreign Application Priority Data

Jul. 17, 1998   (JP)   ................................. 10-219582

(51) Int. Cl.
    *H03M 13/00*   (2006.01)
(52) U.S. Cl. ................... 714/758; 714/770; 714/755
(58) Field of Classification Search ................ 714/770, 714/755, 769, 758, 763, 718; 369/59.25
    See application file for complete search history.

(56) References Cited

U.S. PATENT DOCUMENTS

| | | | | |
|---|---|---|---|---|
| 4,495,623 A * | 1/1985 | George et al. | ................ | 714/755 |
| 4,775,978 A | 10/1988 | Hartness | | |
| 4,949,326 A | 8/1990 | Takagi et al. | | |
| 5,491,701 A * | 2/1996 | Zook | ................ | 714/762 |
| 5,793,779 A | 8/1998 | Yonemitsu et al. | | |
| 5,831,954 A * | 11/1998 | Sako et al. | ................ | 369/59.25 |
| 5,966,359 A | 10/1999 | Sako et al. | | |
| 6,078,559 A | 6/2000 | Takemura et al. | | |
| 6,112,324 A | 8/2000 | Howe et al. | | |
| 6,167,551 A * | 12/2000 | Nguyen et al. | ................ | 714/770 |
| 6,389,503 B1 * | 5/2002 | Georgis et al. | ................ | 711/4 |
| 6,715,122 B2 * | 3/2004 | Carson et al. | ................ | 714/769 |

* cited by examiner

*Primary Examiner*—Fritz Alphonse
(74) *Attorney, Agent, or Firm*—Oblon, Spivak, McClelland, Maier & Neustadt, L.L.P.

(57) ABSTRACT

An ID (identification) information, user data, and a control information are disposed each in one block, and subject to an error correction code (ECC). The user data and control information are disposed in an ECC block 1, while the ID information is disposed in an ECC block 2. The ECC blocks 1 and 2 are coded separately for error correction. The blocks thus coded for error correction are disposed in one physical structure, data is modulated, a sync signal is added to the modulated data, and then the data is written to an optical disc having the above data format.

9 Claims, 14 Drawing Sheets

OPTICAL DISC, METHOD OF WRITE TO SAME AND METHOD OF READ FROM SAME

BACKGROUND OF THE INVENTION

1. Field of the Invention

The present invention relates to an optical disc improved in data format including a user data, ID information and control information, a method of write to the optical disc and a method of read from the optical disc.

2. Description of Related Art

FIG. 1 schematically shows the data format on a conventional optical disc.

In the conventional optical disc, a user data, ID information and control information are coded as one block for error correction, and the coded data are modulated, and a sync signal added to the modulated data for write to the optical disc. Generally, the user data has been pre-coded for an error correction (EDC is added to the user data) separately from the above-mentioned error-correcting coding.

In FIG. 1, the hatched portion of the ECC structure indicates a parity, and the hatched portion of the physical structure indicates an FS (frame sync signal).

FIG. 2 shows a data format for a DVD, as an example. In this data format, one sector contains a 2-kB user data, control and ID information, and EDC. One block consists of 16 sectors, and an information word containing 16 sectors of user data, control and ID information and EDC is coded for error correction (parity is added). In the DVD, RSPC (Reed Solomon product code) is used as correcting code (in this respect, this data format for the DVD is different from that shown in FIG. 1). Assume here that the line direction is C1 and row direction is C2. C1 is RS (182, 172, 11) while C2 is RS (208, 192, 17).

The ECC block is configured as follows:

| | |
|---|---|
| User data | 2048 |
| EDC | 4 |
| Control information | 6 |
| ID information | 6 |
| Total | 2064 × 16 |

One block of data corresponds to 16 sectors. One sector on the optical disc is composed of 26 frames each consisting of a 91-byte data. Two frames correspond to a C1 correcting code. Twenty six frames forming one sector on the optical disc correspond to thirteen C1 correcting codes, and contain 12 lines for an information word in the C2 correcting code direction and one line for the parity word.

For read from the optical disc, an FS signal is used for frame synchronization, then ID information is used for sector synchronization. Thus, data position in one block is known. So, the ID information has to be disposed in a direction of data on the optical disc. Also, it has to be disposed in the same position in each physical sector. FIG. 3 shows the ID information positioned at the bead of each physical sector, for example. On the DVD, the direction of user data is the same as on the optical disc. It should be noted that the operations such as scramble will not be described herein.

Recently, an optical disc having a lager capacity and higher transfer rate and a disc drive for such an optical disc are demanded for use to store dynamic images, etc. In particular, recordable type and rewritable disc systems have to be of a rather large capacity to assure a sufficient quality of an image since the image information cannot easily be real-time compressed at a high efficiency, which depends upon the content thereof. For such a larger capacity of the optical disc, there are available methods such as increased NA (numerical aperture) of the optical system for data write and/or read and decrease in thickness of the disc substrate to assure a sufficient skew margin, etc. However, since the increase of capacity will lead to a higher recording density of the optical disc and the decrease of the disc will cause the disc to be adversely affected by dust, it is desirable to assure the larger capacity of the optical disc by improving the capability of error correction. The optical disc should desirably be strong against a burst error among others. On the other hand, for a larger capacity of the optical disc, the coding efficiency should not be too low. For these purposes, it has been proposed to enlarge the error-correcting code, namely, increase the size of an ECC block. However, it is difficult to use the normally used PC (product code) of GF ($2^8$) in a larger ECC block than used in the DVD technology, for example, an ECC block containing more than 64 kB of user data.

An ECC block in which an LDC (long distance code; one-directional correcting code of a long distance (having many parities) is configured with a deep interleave is more suitably usable in these situations.

LDC is advantageous in that the time required for correcting operation is shorter since a single pass of correction is only required basically and write and read can be done with a high efficiency since output simultaneous with a correcting operation is enabled by disposing the direction of user data in the same direction as error-correcting code. With the user data disposed in the same direction as the error-correcting code, an error which could not be corrected can be prevented from being dispersed into a plurality of logical sectors. Because of this fact, the user code should preferably be arranged in the same direction as the error-correcting code. For use of LDC, the error-correcting code direction is set orthogonal (interleaved) to the disc direction to enhance the resistance of the optical disc against burst error. In effect, the error-correcting code should be disposed in the same direction as the user data direction but in a different direction from the disc direction.

FIG. 4 shows an example of the conventional data format to a large-capacity optical disc. In this data format, one logical sector contains a 2-kB user data, control information and EDC, and one block consists of 32 logical sectors and ID information. The block is formed from an information word consisting of the 32 logical sectors of user data (equivalent to 64 kB), control information, EDC and ID information and which is coded for error correction (parity is added). The code used is LDC.

The above can be expressed as follows:

| | |
|---|---|
| User data | 2048 |
| EDC | 4 |
| Control information | 22 |
| ID information | 6 |
| Total | 2070 × 32 |

This content is disposed in the ECC block, and can be represented by RS (240, 208, 33)×320.

One block of data equivalent to 32 physical sectors on the optical disc. One physical sector on the optical disc consists of 10 frames each of 240-byte data.

For read from the optical disc, an FS signal is used for frame synchronization, then ID information is used for sector synchronization. Thus, data position in one block is known. So, the ID information has to be disposed in a direction of data on the optical disc. Also, it has to be disposed in the same position in each physical sector, and also in the same position in each of the physical sectors. As shown in FIG. 5, the ID information is positioned at the head of each physical sector, for example.

The user data should desirably be disposed in the same direction as on the optical disc. As seen from FIG. 4, however, the ID information interferes with this positioning so that it is difficult to dispose the logical sector in the direction of the error-correcting code. Also, a physical sector full of parity word because no ID information cannot be placed in that physical sector. Therefore, limitations have to be imposed to the data formatting so that information word and parity word can be positioned evenly in each of the physical sectors.

As mentioned above, for providing a large-capacity, high transfer-rate optical disc format and optical disc drive, it may be possible to provide the interleave length, enhance the error-correcting capability by using an error-correcting code of a large code distance (LDC) and raise the writing and reading speed by disposing error-correcting code in the same direction as user data. In this case, however, since parities in ID information and user data interference with each other, it is not easy to form such a data format.

SUMMARY OF THE INVENTION

Accordingly, the present invention has an object to overcome the above-mentioned drawbacks of the prior art by providing an optical disc whose the data format including a user data, ID information and control information is improved so that a same direction can be selected for disposition of the user data and control information as well as for error-correcting code with no care about parities in the error-correcting codes for the ID information and user data, a method of write to the optical disc and a method of read from the optical disc.

The above object can be attained by providing an optical disc having a data format in which a user data and a control information in a logical sector are disposed in block, and an ID information in a physical sector is disposed in the other block, and they are coded for error correction.

Further, the above object can be attained by providing an optical disc having a data format in which a user data, a control information in a logical sector and an ID information in a physical sector are disposed each in one block, and they are coded for error correction.

Still further, the above object can be attained by providing an optical disc having a data format in which a user data is disposed in one block, and a control information in a logical sector and an ID information in a physical sector are disposed in the other block, and they are coded for error correction.

Yes further, the above object can be attained by providing an optical disc having each of the data formats in which an error-correcting code whose code distance is long (LDC) in one direction and the user data is arranged in the same direction as the error-correcting code.

Also the above object can be attained by providing a method of write to an optical disc in a data format in which a user data, a control information in a logical sector, and an ID information in a physical sector are disposed each in one block, and they are coded for error correction, or in which a user data is disposed in one block, and a control information in a logical sector and an ID information in a physical sector are disposed in the other block, and they are coded for error correction, the method comprising, according to the present invention, the steps of:

combining a control information from an application program with other control information (inherent control information including a drive ID, disc ID, etc.) or converting the information in an optical disc drive; and encrypting or scrambling the user data with the control information thus combined or converted.

Further, the above object can be attained by providing a method of write to an optical disc in a data format in which a user data, a control information in a logical sector, and an ID information in a physical sector are disposed each in one block, and they are coded for error correction, or in which a user data is disposed in one block, and a control information in a logical sector and an ID information in a physical sector are disposed in the other block, and they are coded for error correction, the method comprising, according to the present invention, the steps of:

combining a control information from an application program with other control information (inherent control information including a drive ID, disc ID, etc.) or converting the information in an optical disc drive; and writing to the optical disc the information thus combined or converted as a block of control information.

Still further, the above object can be attained by providing a method of reading data from an optical disc having a data format in which a user data, a control information in a logical sector, and an ID information in a physical sector are disposed each in one block, and they are coded for error correction, or in which a user data is disposed in one block, and a control information in a logical sector and an ID information in a physical sector are disposed in the other block, and they are coded for error correction, the method comprising, according to the present invention, the steps of:

decrypting ore descrambling the intra-block control information corresponding to the control information in the data format in the block while sending in any other format the intra-block control information corresponding to the control information in the data format to the application program.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

According to the present invention, an ID information, user data and a control information are disposed each in one block, and coded for error correction.

Figure 6:
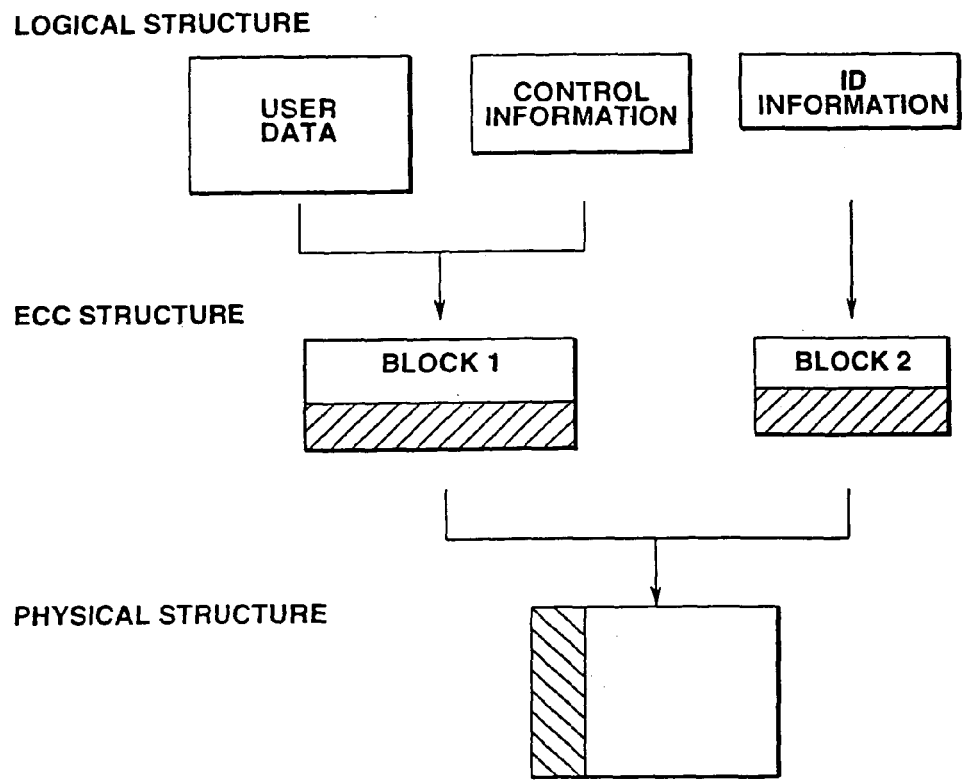
FIG. 6 schematically illustrates a data format in which a user data is disposed in one block, and a control information and ID information are disposed in the other block.

As shown in FIG. 6, for example, the user data and control information are disposed in an ECC block 1, while the ID information is disposed in an ECC block 2. The ECC blocks 1 and 2 are coded independently for error correction. Each of the ECC blocks thus coded (parity is added) for error correction is disposed in one physical structure, data is modulated, a sync signal is added to the modulated data, and then the data is written to the optical disc.

Figure 1:
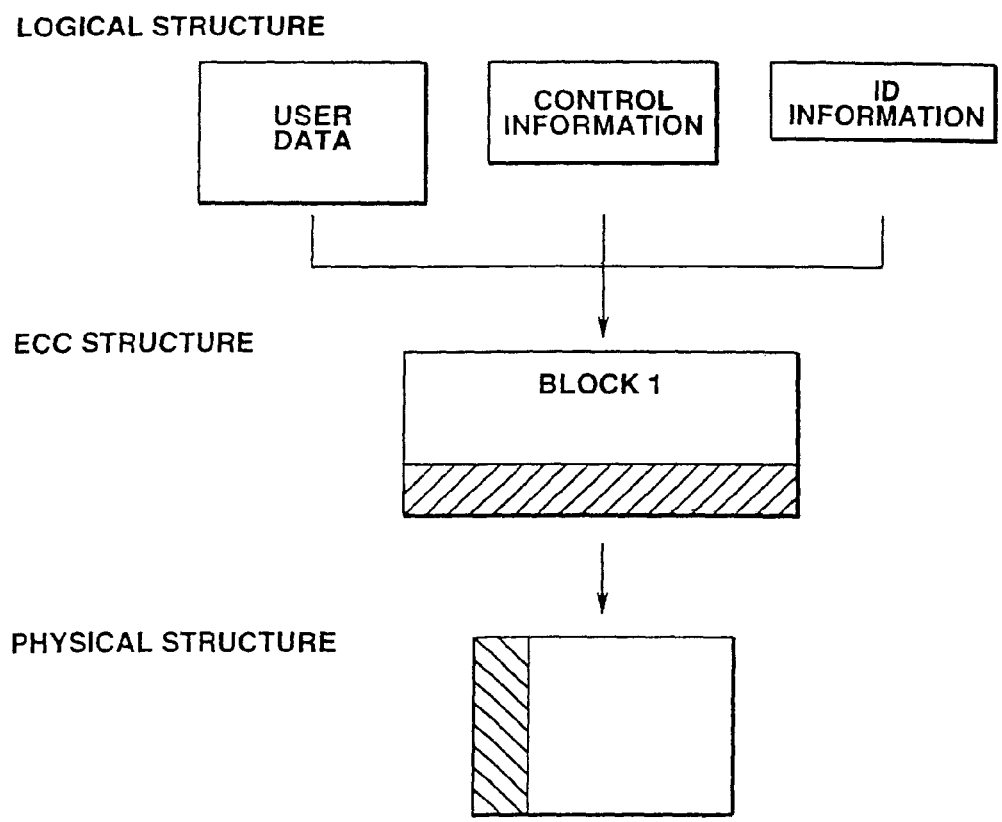
FIG. 1 schematically illustrates a data format for write/read to/from the conventional optical disc.
Figure 2:
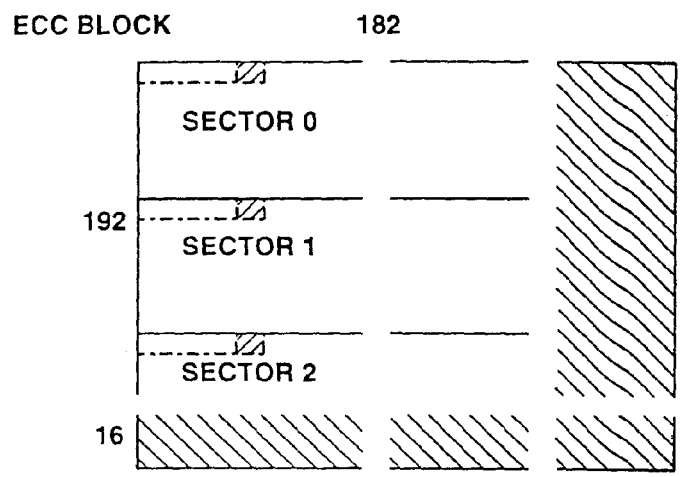
FIG. 2 is shows a data format for write/read to/from DVD.
Figure 3:
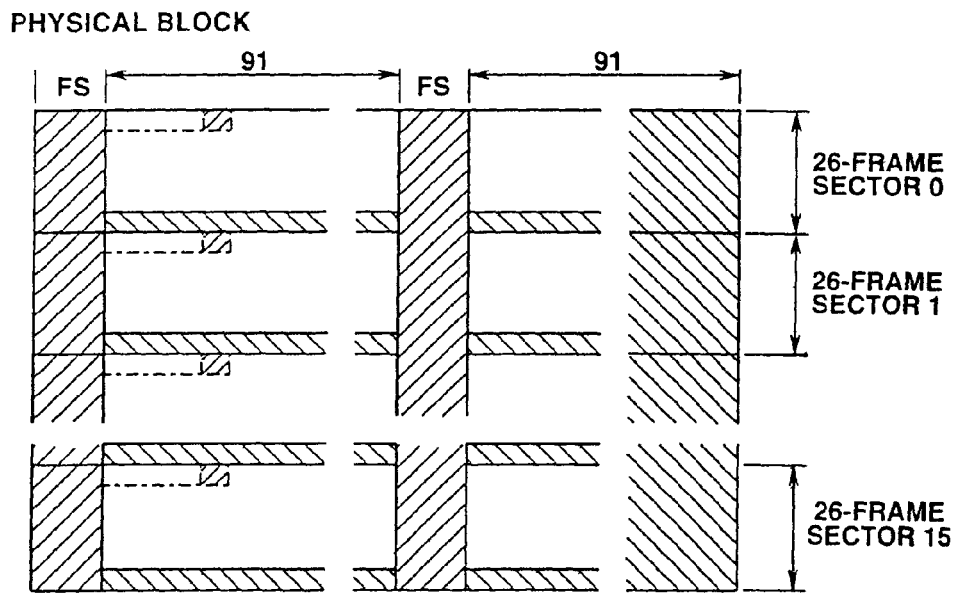
FIG. 3 shows a data format in which ID information is positioned at the head of each physical sector.
Figure 4:
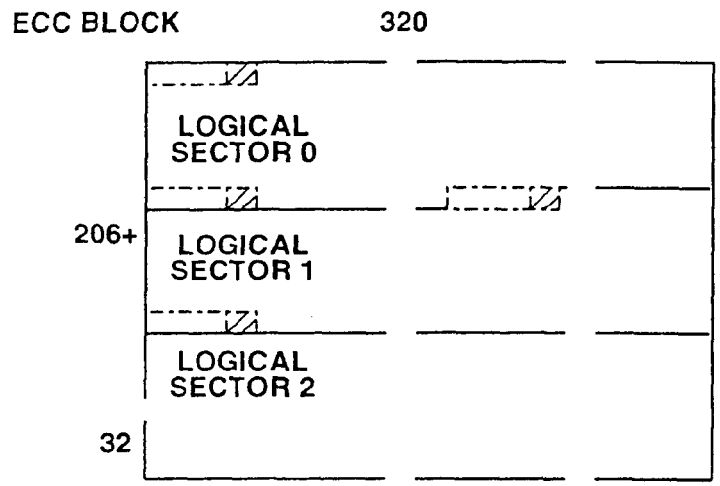
FIG. 4 shows a conventional data format applied to a large-capacity optical disc.
Figure 5:
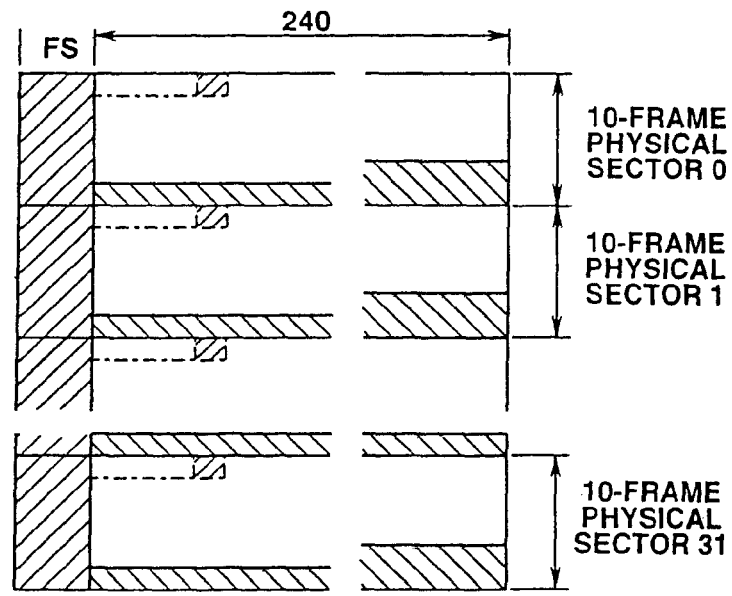
FIG. 5 shows a conventional data format in which ID information is positioned at the head of each physical sector.

Generally, the user data has been pre-coded for an error correction (EDC is added to the user data) separately from the above-mentioned error-correcting coding as having previously been described with reference to FIG. 1.

In FIG. 6, the hatched portion of the ECC structure indicates a parity and that of the physical structure indicates FS (frame sync signal). The ID information, control information and the user data are disposed each in one block, and coded for error correction.

Figure 7:
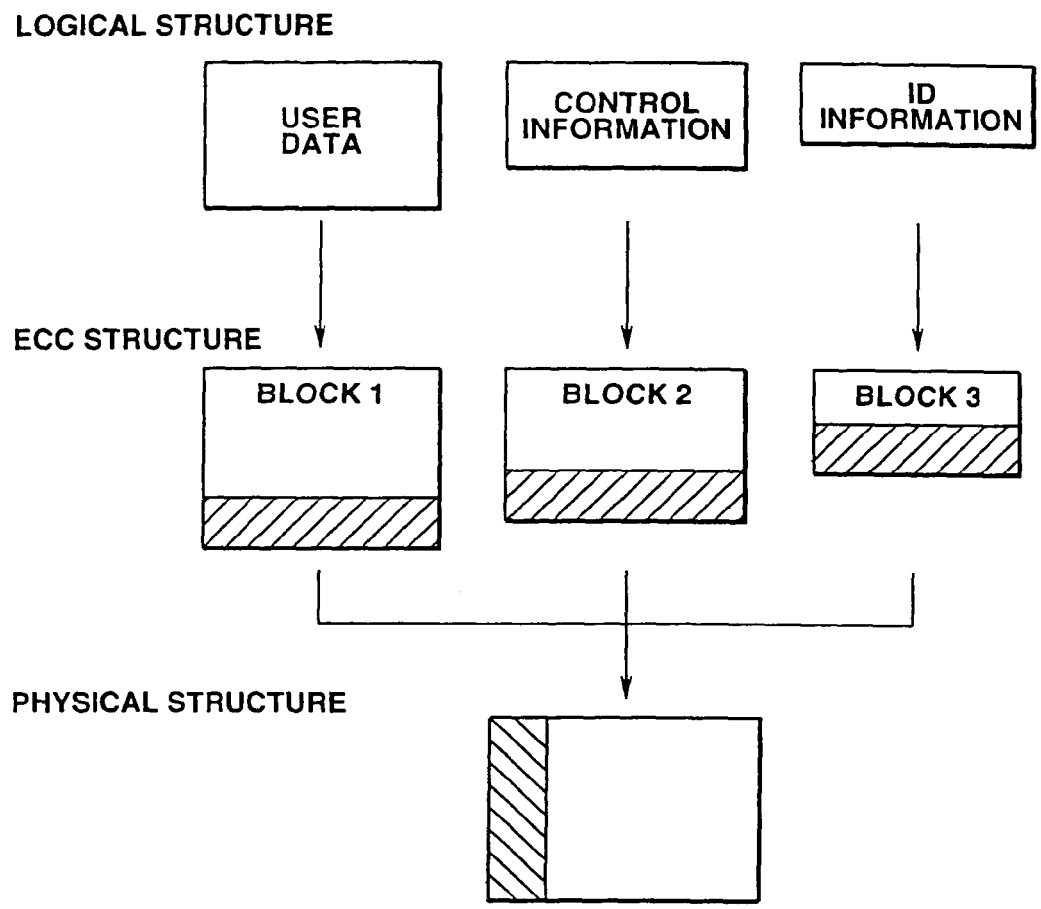
FIG. 7 schematically illustrates a data format in which a user data, a control information, and an ID information are positioned in separate blocks, respectively.

As shown in FIG. 7, the user data is disposed in the ECC block 1, the control information is in the ECC block 2, and the ID information is in an ECC block 3. The ECC blocks 1 to 3 are coded independently for error correction. The ECC blocks thus coded for error correction (parity is added) are disposed in one physical structure, data is modulated, a sync signal is added to the modulated data, and then the data is written to the optical disc.

Generally, the user data has been pre-coded for an error correction (EDC is added to the user data) separately from the above-mentioned error-correcting coding. The hatched portion of the ECC structure in FIG. 7 indicates a parity and that of the physical structure indicates FS (frame sync signal).

The EDC is handled as a control information, not as a user data, in some methods. In this case, the EDC is handled in the same manner as a control information and disposed in the ECC block 2 although the above-mentioned EDC is handled as a user data and disposed in the ECC block 1 as shown in FIG. 7.

If the control information is not required in logical sectors but in blocks, or if the control information can easily be disposed in the same block even when it is required in logical sectors, ID and control information may be disposed in the same ECC block. In this case, the user data is disposed in the ECC block 1 while the ID and control information are disposed in the ECC block 2, as shown in FIG. 8.

The ECC blocks 1 and 2 are coded independently for error correction. Each of the ECC blocks thus coded for error correction (parity is added) are disposed in one physical structure, data is modulated, a sync signal is added to the modulated data, and the data is written to the optical disc.

Figure 8:
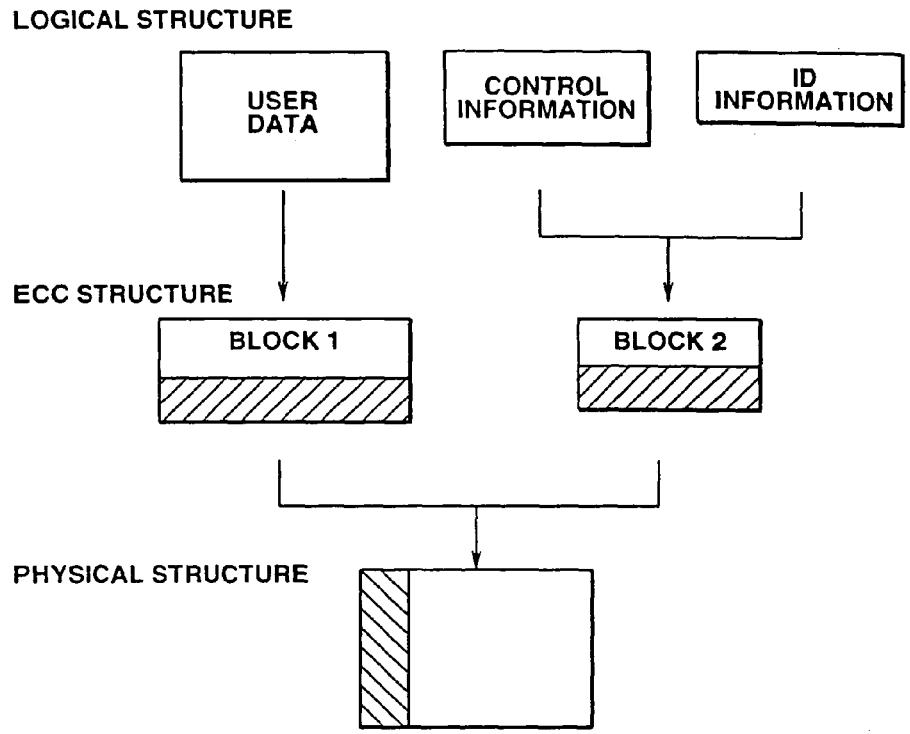
FIG. 8 schematically illustrates a data format in which a user data and control information are disposed in one block, and an ID information is disposed in the other block.

In FIG. 8, the hatched portion of the ECC structure indicates a parity and that of the physical structure indicates FS (frame sync signal).

Since generally the user data has been pre-coded for an error correction (EDC is added to the user data) separately from the above-mentioned error-correcting coding, there are two possible cases: EDC is included in the user data in the logical structure, namely, in the ECC block 1 in the ECC structure, and EDC is included in the control information in the logical structure, namely, in the ECC block 2 in the ECC structure, as shown in FIG. 8.

With the blocks being independent of each other depending upon the content of the information as in the above, they can be composed with no care about a possible mutual influence of them.

For example, the same direction of the user data and control information as that of the error-correcting code can be selected with no care about the ID information. Also, the control information can be handled differently by making it independent of the user data. For example, direct access to the control information from the user can be avoided.

Next, the data format in FIG. 7 will be described below concerning its configuration with reference to FIGS. 9 to 13.

Figure 9:
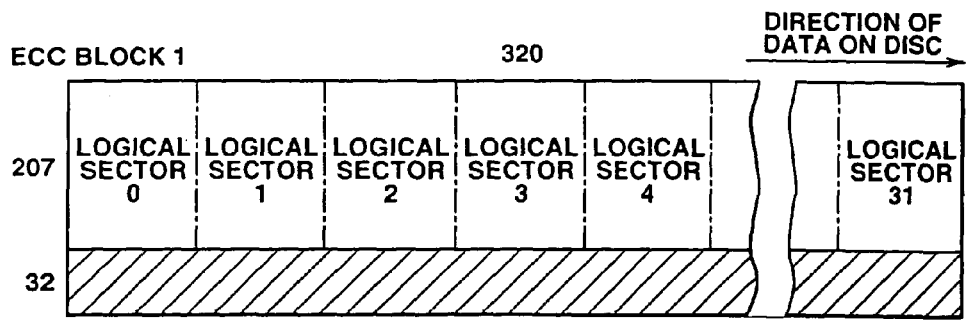
FIG. 9 shows an example of the data format in FIG. 6 applied to a large-capacity optical disc.

As shown, one logical sector includes 2-kB (2048) user data, 18-byte control information and 4-byte EDC. The ECC block 1 consists of 32 logical sectors, the information word containing the logical sectors of user data (equivalent to 64 kB), control information and EDC being coded for error correction (parity is added). A code used for the ECC block 1 is RS (239, 207, 33). The codes count 320 in number as shown in FIG. 9.

The above can be expressed as follows:

| User data | 2048 |
|---|---|
| EDC | 4 |
| Control information | 18 |
| Total | 2070 × 32 |

This is disposed in the ECC block 1, and can be represented with RS (239, 207, 33)×320.

Figure 10:
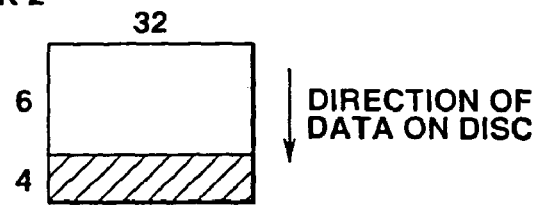
FIG. 10 shows an ECC block 2 which ID information used for synchronization and addressing of physical sector forms separately from the user data and control information.

The data in the ECC block 1 are equivalent to 32 physical sectors on the optical disc. The ID information used for synchronizing and addressing these physical sectors is disposed in the ECC block 2 as shown in FIG. 10 separately from the user data and control information. The ECC block 2 consists of 32 physical sectors of 6-byte ID information, the information word being coded for error correction (parity is added). The code used for the ECC block 2 is RS (10, 6, 5), for example, and the codes count 32 in number.

The data content of the ID information is 6×32. This is disposed in the ECC block 2 and can be represented with RS (10, 6, 5)×32

One physical sector on the optical disc consists of 10 frames each of 240-byte data.

For read from the optical disc, an FS signal is used for frame synchronization, then ID information is used for sector synchronization. Thus, data position in one block is known. So, the ID information has to be disposed in a direction of data on the optical disc. Also, it has to be disposed in the same position in each physical sector, and also in the same position in each of the physical sectors. Even in the configuration shown in FIG. 11 for example, the ID information is positioned at the head of each physical sector. However, since the ECC blocks 1 and 2 are independent of each other, the logical sector can be composed with no care about of the ID information.

The error-correcting code and data in the logical sector can be disposed in the same direction (as the user data, control information).

It should be noted that the operations such as scrambling will be described herein.

Figure 11:
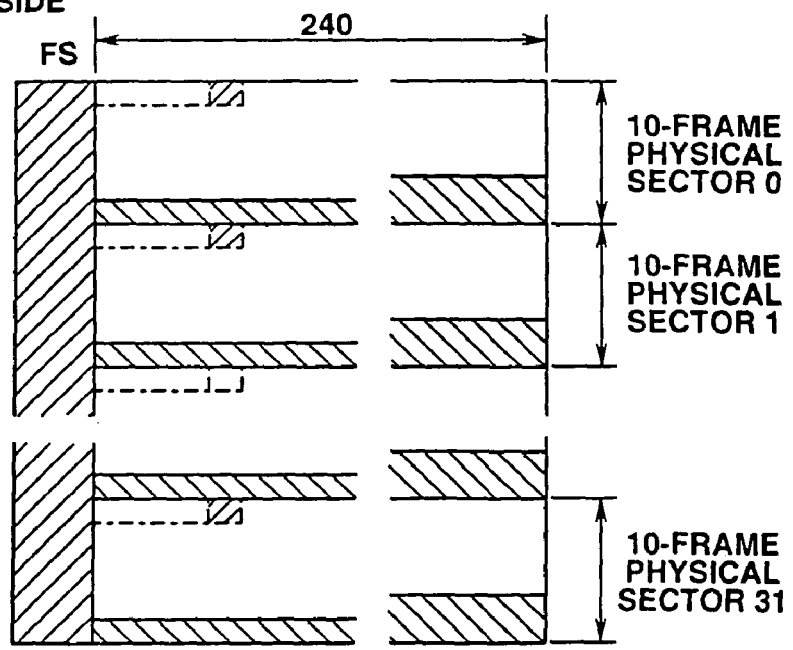
FIG. 11 shows, by way of example, the configuration of a data format in which ID information is positioned at the bead of each physical sector.
Figure 12:
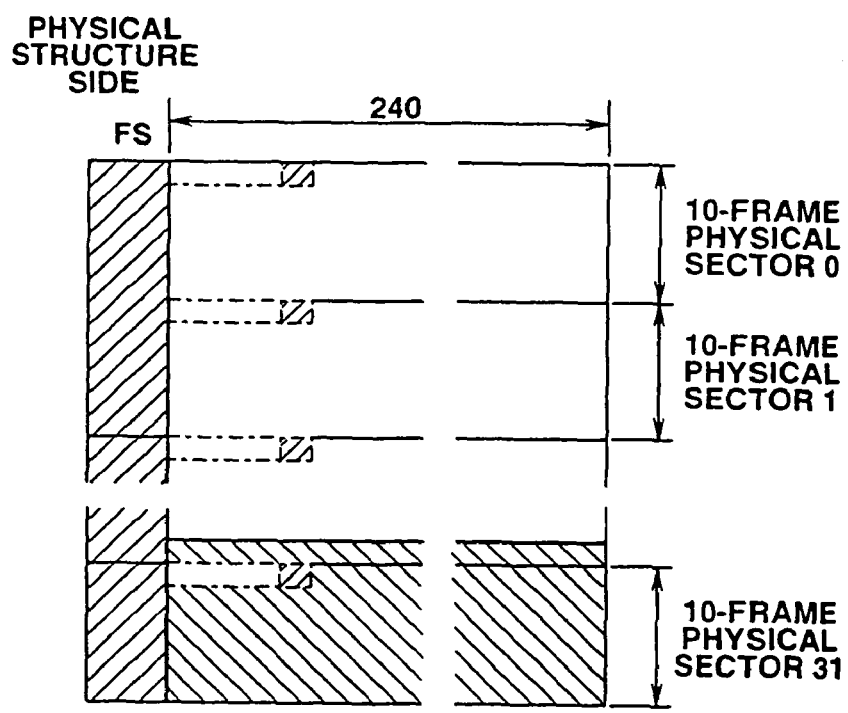
FIG. 12 shows, by way of example, the configuration of a data format in which information word in an ECC block 1 are allocated to the former physical sectors while parity word is allocated to the latter physical sectors.

As shown in FIG. 11, the information word and parity word of the ECC block 1 are allocated to each physical sector. Since the data in the ECC block 1 may be disposed in the total of the 32 logical sectors, however, the information word of the ECC block 1 may be allocated to the former physical sectors while the parity word may be allocated to the latter physical sectors as shown in FIG. 12.

Figure 13:
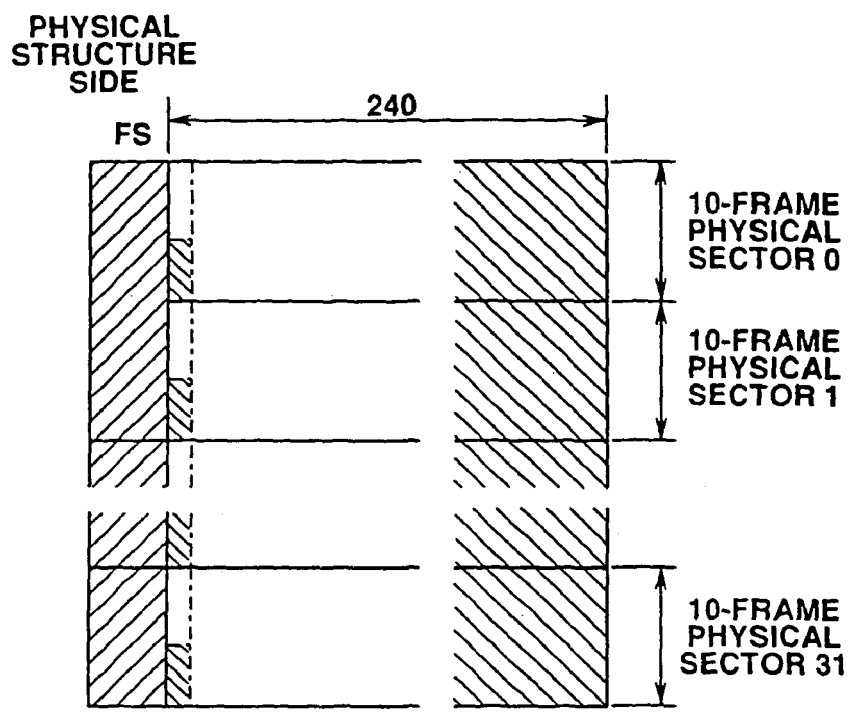
FIG. 13 shows, by way of example, the configuration of a data format in which information word in the ECC block 1 and parity word are allocated to one frame.

Also, if the rule of interleaving is met, the data may be disposed in the ECC block 1 to be oblique to the data direction on the optical disc. In the physical structure, the information word and parity word of the ECC block 1 will be allocated in the frame as shown in FIG. 13. The data from the ECC block 2 may be of 1 byte at the head of each frame. There is no problem since one code (equivalent to one physical sector of ID information) in the ECC block 2 containing the ID information is complete with one physical sector and the ID information is disposed in a fixed position within the physical sector.

As having been described in the above, no care is required about the disposition of the information word and parity word in an area corresponding to the ECC block 1.

Figure 14:
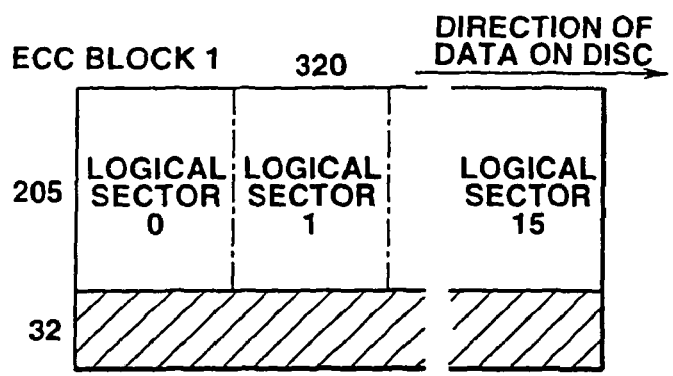
FIG. 14 shows an example of the data format in FIG. 7 applied to a large-capacity optical disc.

Next, the data format in FIG. 8 will be described below concerning its configuration with reference to FIGS. 14 to 16.

As shown, one logical sector includes 4-kB (4096) user data, 24-byte control information and 4-byte EDC. The ECC block 1 consists of 32 logical sectors of user data including EDC, and the ECC block 2 consists of 16 logical sectors of control information. The information word in each block is coded for error correction (parity is added). A code used for the ECC block 1 is RS (237, 205, 33). The codes count 320 in number as shown in FIG. 14.

The above can be expressed as follows:

| | |
|---|---|
| User data | 4096 |
| EDC | 4 |
| Total | 4100 × 16 |

This is disposed in the ECC block 1, and can be represented with RS (237, 205, 33)×320.

Figure 15:
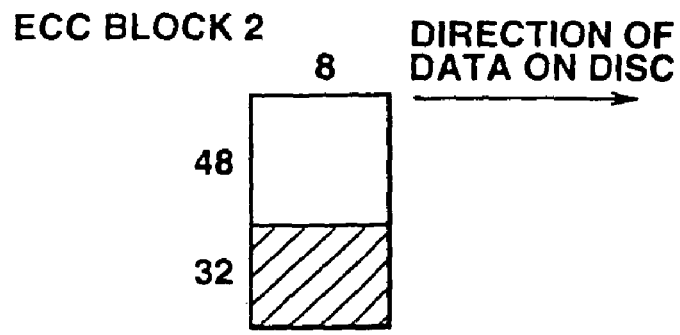
FIG. 15 shows the configuration of the ECC block 2.
Figure 16:
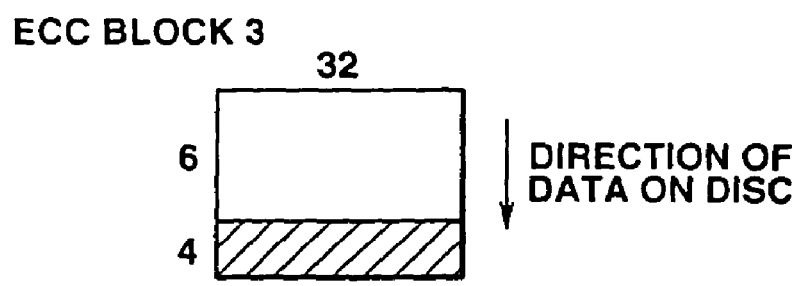
FIG. 16 shows the configuration of an ECC block 3.

A code used in the ECC block 2 is RS (80, 48, 33), and the codes count 8 in number as shown in FIG. 15.

The above can be expressed as follows:

24×16

This is disposed in the ECC block 1, and can be represented with RS (80, 48, 33)×8.

The data in the ECC blocks 1 and 2 are equivalent to 32 physical sectors on the optical disc. The ID information used for synchronizing and addressing these physical sectors is disposed in the ECC block 3 separately from the user data and control information. The ECC block 3 consists of 32 physical sectors of ID information, and the information word is coded for error correction (parity is added). A code used for the ECC block 3 is RS (10, 6, 5), for example, and the codes count 32 in number as shown in FIG. 16.

The ID information has a content of 6×32, and is disposed in the ECC block 2. This can also be represented with RS (10, 6, 5)×32.

Figure 17:
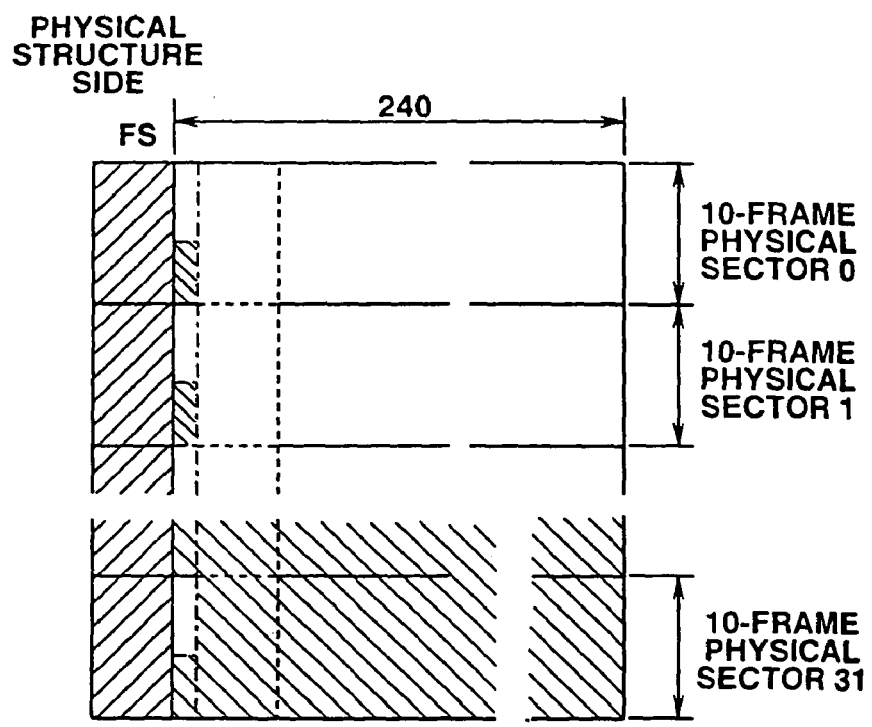
FIG. 17 shows a physical data configuration on the optical disc.

One physical sector on the optical disc consists of 10 frames each of 240-byte data as shown in FIG. 17.

For read from the optical disc, an FS signal is used for frame synchronization, then ID information is used for sector synchronization. Thus, data position in one block is known. So, the ID information has to be disposed in a direction of data on the optical disc. Also, it has to be disposed in the same position in each physical sector, and also in the same position in each of the physical sectors. However, since the ECC blocks 1 and 2 are independent of the ECC block 3, the logical sector can be composed with no care about of the ID information.

The error-correcting code and data in the logical sector can be disposed in the same direction (as the user data, control information).

The ECC blocks 1 and 2 are easy to handle independently. For example, the ECC block 2 can be made inaccessible from the user by making the ECC block 1 inaccessible directly from the user, It should also be noted that the operations such as scrambling will not be described herebelow.

The ID information having been described in the above concerns an address information destined for locating a physical sector. If an address information for a logical sector is necessary, it may be included in a separate control information.

To change a user data by a control information, for example, to encrypt or scramble a user data by a control information, an error-correcting code for an ECC block also including a control information should have a higher capability than a error-correcting code for an ECC block including a user data.

Also, if EDC is included in a control information and it is judged in the EDC whether a final user data is erroneous or not, an error-correcting code for an ECC block including the EDC should have a higher capability than an error-correcting code for an ECC block including a user data. For such a higher capability of error correction, interleave length is increased until it goes over one block and the code is shortened with the code distance kept unchanged as for an ECC block of a user data. In case EDC exists, not as a control information, in a block also including a user data, the error-correcting code for an ECC block including a control information may not have a higher capability than that for an ECC block including a user data.

Since ID information can be checked for continuity for synchronization and access, an error-correcting code for an ECC block including the ID information may not have high capability. Generally, the ID information should rather desirably be readable and detectable (correctable) for error at high speed. For the synchronization, ID information should desirably be readable and detectable/correctable for error at least within a physical block. That is, an error-correcting code for ID information should be completed in a sector in the direction of the optical disc.

In case the direction of an error-correcting code (code direction) suitable for control information is different from a code direction suitable for ID information as mentioned above and the control and ID information are to be disposed in the same ECC block as shown in FIG. 8, a code suitable for the ID information, for example, is generated (IDE is added to ID) and thereafter the code is coded along with the control information in a code direction suitable for the control information to compose the ECC block 2.

A read-only optical disc has a repetition of data area (frame group) formed according to the aforementioned data format. A user data part provides a desired data. Write is made by embossed pits.

To write a desired data in a desired position or to read a desired data from a desired position in a recordable type and rewritable type optical discs, addressing is effected using pre-address part pre-formed on the optical disc.

Figure 18:
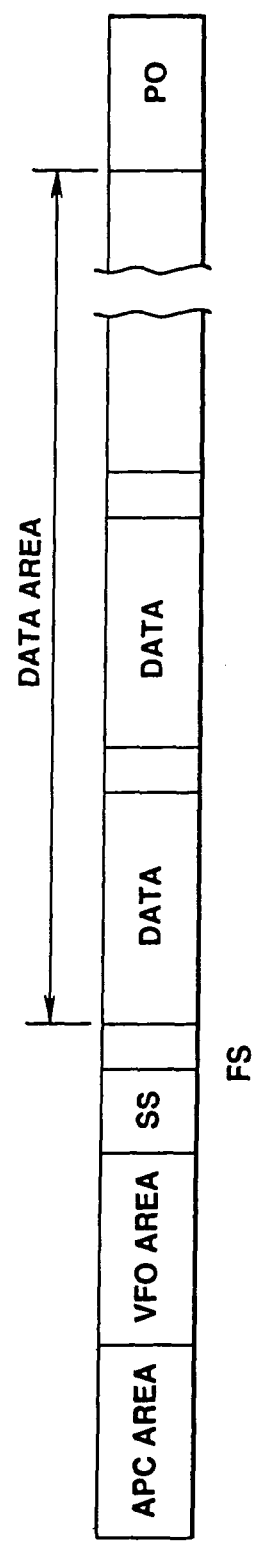
FIG. 18 shows, by way of example, the configuration of a data area on recordable type and rewritable type optical discs.

For example, an optical disc is divided into physical sectors in each of which an address is pre-recorded. Addressing is made using the pre-recorded address to write or read data from each physical sector. For this purpose, a data part to write or read consists of APC area, VFO, SS, data area (frame group) and PO as shown in FIG. 18.

The data area is divided into physical sectors. The APC (automatic power control) area is to control the read laser power. The VFO area is to use PLL (phase-locked loop) for extraction of a clock for reading. The SS (sector sync) area provides a sync signal for a physical sector. The PO (postamble) area is a supplement data following a data. Since writing operation (data) and reading operation (data) are parted by each pre-recorded address, APC, VFO and SS are required for each physical sector.

In effect, each of recordable type and rewritable type optical discs has a pre-recorded address area, data area and a gap between the areas.

By using a same data format in the data areas of a read-only optical disc and recordable and rewritable type optical discs, respectively, the optical disc drives for these types of optical discs can use a same circuit related to the data format, so that the same optical disc drive can be used with all such types of optical discs.

Figure 19:
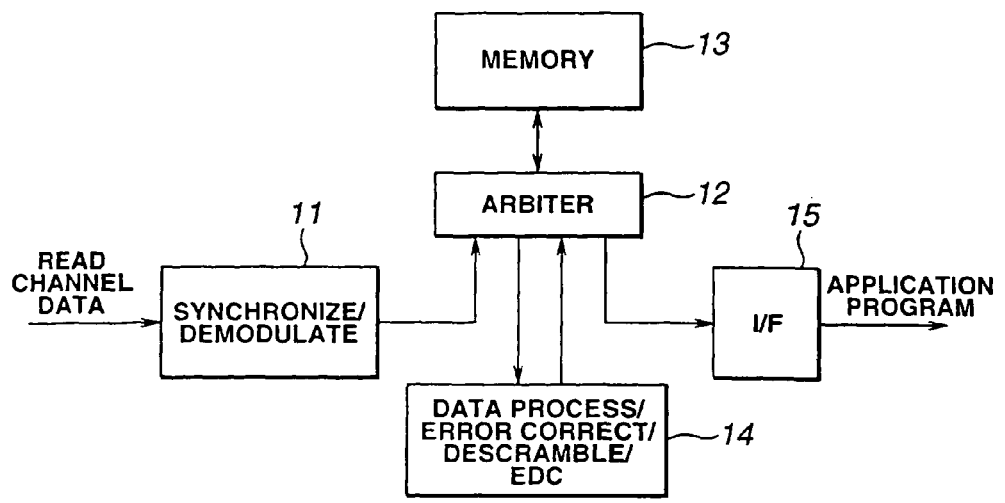
FIG. 19 is a block diagram of a data processing block of a disc drive for a read-only optical disc.

FIG. 19 shows a data processing block of a read-only optical disc drive. The data processing block will be described concerning an optical disc having a data format as shown in FIG. 6.

A synchronization/demodulation circuit 11 synchronizes frames, demodulates data, and synchronizes sectors. For the sector synchronization, ID information is detected or corrected for any error. Namely, the ECC block 2 is decoded. The synchronized and demodulated data is supplied to a memory 13 via an arbiter 12. When data for one block has been put into the memory 13, a data processor 14 corrects a user data for any error. Namely, the ECC block 1 is decoded, descrambled, and then detected by EDC.

If the error-correcting code and EDC have a same direction, data corrected for error in the data processor 14, descrambled data, and data detected for error by EDC can collectively be put in series into the memory 13 without write or read at each time.

If the control information is disposed in the ECC block as shown in the example in FIG. 7, the control information can be corrected for error before a user data is so that the user data can collectively be processed in series as in the above, since a necessary control information and EDC (code) for error correction of the user data is readily usable owing to the completed correction of the control information. A user data subjected to necessary processes such as error correction, descrambling and error detection/correction by EDC is written into the memory 13. When it is found as a result of the error detection by EDC that the user data is not erroneous, the data is sent to an I/F circuit 15 from the memory 13.

Figure 20:
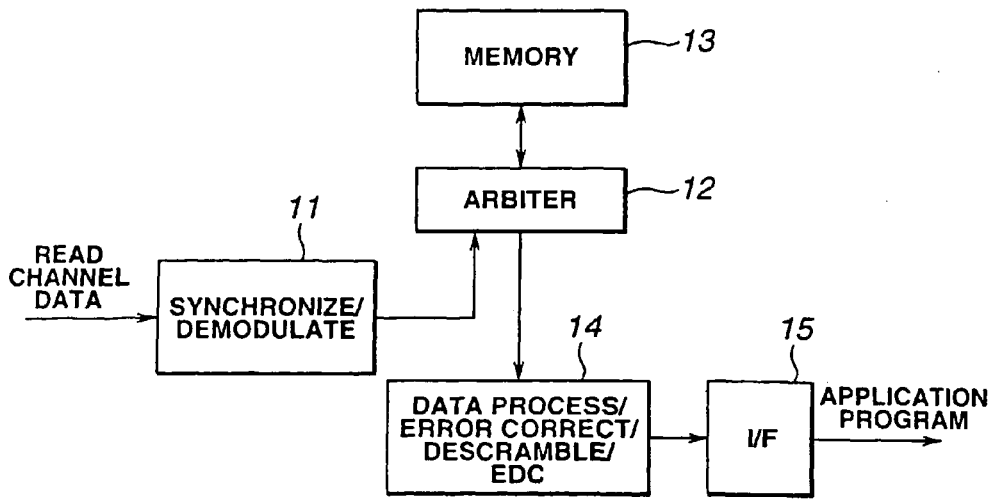
FIG. 20 is a block diagram of a data processing block for data output during error detection.

If data may be outputted in the course of an error detection by EDC, it may first be delivered directly without write into the memory 13 as shown in FIG. 20.

Figure 21:
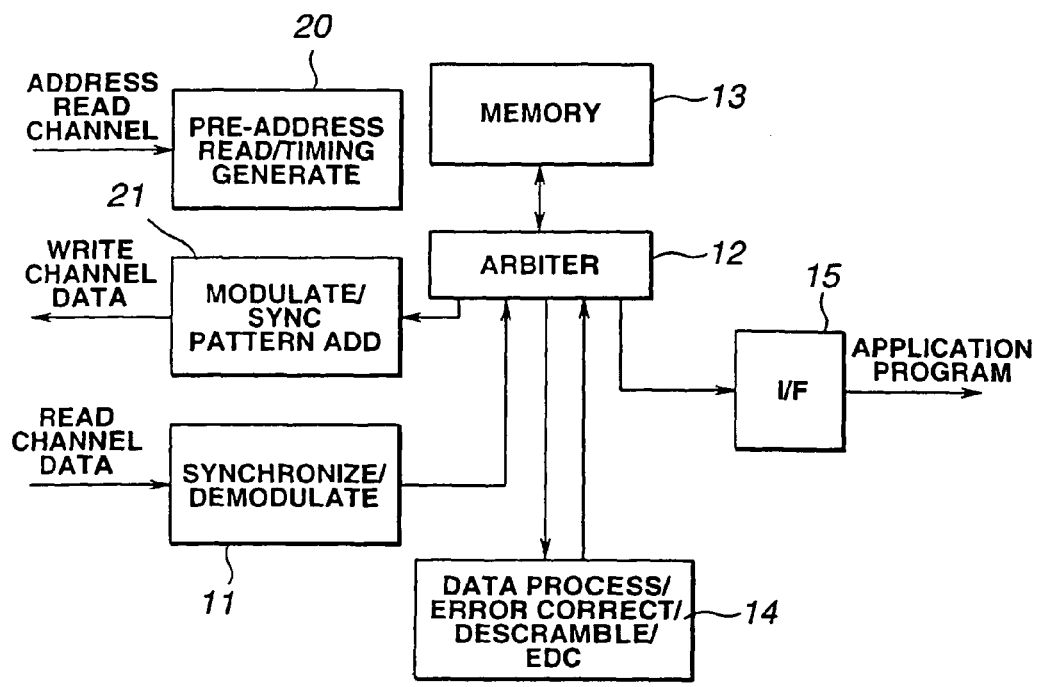
FIG. 21 is a block diagram of a data processing block of a disc drive for a recordable type and rewritable type optical discs.

In the recordable type and rewritable type optical disc drive, a data part including data area (frame group) is controlled based on information from a pre-recorded address as shown in FIG. 21.

Data reading is effected through the blocks configured as in FIG. 19 except that synchronization can be attained with a timing signal from a pre-address reading/timing generation circuit 20 and sync signals such as SS and FS. Data write is effected by a modulation/sync pattern addition circuit 21 in each data area with a timing signal from the pre-address reading/timing generation circuit 20.

The modulation/sync pattern addition circuit 21 effect encoding, modulation, addition of sync signal, and addition of APC, VFO and PO patterns in an opposite order to that for data read.

As having been described in the foregoing, when formed independently of each other depending upon the content of information in them, the ECC blocks will not influence each other. For example, a user data and control information can be disposed in the same direction as an error-correcting code with no care about the parity in each of ID information and user data.

Also, control information can be made independently of user data for handling them in different manners, respectively. For example, direct access to them from the user can thus be avoid.

Further, particular numerical values can easily be selected for composition of a data format.

What is claimed is:

1. An optical disc having a data format, comprising:
  a first ECC (error correction code) data structure including at least a user data disposed in a first ECC block; and
  a second ECC data structure including at least a control information and ID information of a physical sector disposed in a second ECC block, the first and second ECC blocks are error correction coded independently;
  wherein the first and second ECC blocks are of the same ECC data structure, each interleaved independently, and expressed on the disc in a same physical data cluster, and said user data being arranged in the same direction as the error correction code having a long distance code (LDC) and said ID information being disposed in a direction of data on the optical disc.

2. The optical disc according to claim 1,
  wherein the error correction code of the block in which the control information is coded has a higher capability than the error correction code of the block in which the user data is coded.

3. A method of recording to an optical disc, comprising:
  coding a first ECC (error correction code) block for error correction such that user data with EDC (error detection code) is disposed in the first ECC block;
  coding a second ECC block for error correction separately from the first ECC block such that control information and ID information are disposed in the second ECC block, the first and second ECC blocks are of the same ECC data structure, each interleaved independently, and error correction coded independently;
  modulating data of the first and second ECC blocks;

adding a synchronization signal to the modulated data such that the first and second ECC blocks are disposed in one physical data cluster; and recording the modulated data with the synchronization signal to the optical disc;

said user data being arranged in the same direction as the error correction code having a long distance code (LDC) and said ID information being disposed in a direction of data on the optical disc.

4. An apparatus of recording to an optical disc, comprising:

a first encoding portion for encoding a first ECC (error correction code) block for error correction such that user data with EDC (error detection code) is disposed in the first ECC block;

a second encoding portion for encoding a second ECC block for error correction separately from the first ECC block such that control information and ID information are disposed in the second ECC block, the first and second ECC blocks are of the same ECC data structure, each interleaved independently, and error correction coded independently;

a modulating portion for modulating data of the first and second ECC blocks;

an adding portion for adding a synchronization signal to the modulated data such that the first and second ECC blocks are disposed in one physical data cluster; and a recording portion for recording the modulated data with the synchronization signal to the optical disc;

said user data being arranged in the same direction as the error correction code having a long distance code (LDC) and said ID information being disposed in a direction of data on the optical disc.

5. The recording apparatus according to claim 4, wherein the error correction code for the second ECC block including the control information has a higher capability than the error correction code for the first ECC block including the user data.

6. The recording apparatus according to claim 4, further comprising:

a combining portion for combining the control information from an application program with other control information;

a converting portion for converting the information in an optical disc drive; and an encrypting or scrambling portion for encrypting or scrambling the user data with the control information thus combined or converted.

7. The recording apparatus according to claim 4, further comprising:

a combining portion for combining a control information from an application program with other control information;

a converting portion for converting the information in an optical disc drive; and a recording portion for recording to the optical disc the information combined and converted as a block of control information.

8. An apparatus of reproducing data from an optical disc, comprising:

a decoding portion for respectively decoding a first ECC block in which at least a user data is disposed and a second ECC block in which at least a control information and ID information of a physical sector are disposed, said each block encoded to error correction code independently;

a sending portion for sending control information disposed in said second ECC block to an application program in any other format; and a reproducing portion for reproducing the user data according to the control information, said optical disc having a data format having a physical data cluster in which the first ECC block and the second ECC block being of the same ECC data structure, each interleaved independently, and expressed on the disc; and said user data being arranged in the same direction as the error correction code having a long distance code (LDC) and said ID information being disposed in a direction of data on the optical disc.

9. A method of reproducing data from an optical disc, comprising:

respectively decoding a first ECC block in which at least a user data is disposed and a second ECC block in which at least a control information and ID information of a physical sector are disposed, said each block being encoded to error correction code independently;

sending control information disposed in said second ECC block to an application program in any other format; and reproducing the user data according to the control information, said optical disc having a data format having a physical data cluster in which the first ECC block and the second ECC block being of the same ECC data structure, each interleaved independently, and expressed on the disc; and said user data being arranged in the same direction as the error correction code having a long distance code (LDC) and said ID information being disposed in a direction of data on the optical disc.

* * * * *